US009920669B2

United States Patent
De Luca et al.

(10) Patent No.: US 9,920,669 B2
(45) Date of Patent: Mar. 20, 2018

(54) METHOD TO CONTROL THE SEALING OF A BLOW-BY GAS BREATHER CIRCUIT OF AN INTERNAL COMBUSTION ENGINE

(71) Applicant: MAGNETI MARELLI S.p.A., Corbetta (IT)

(72) Inventors: Luigi De Luca, Bologna (IT); Jacopo Bucchi, Pesaro (IT); Stefano Sgatti, Imola (IT); Massimo Zanotti, Vado (IT)

(73) Assignee: MAGNETI MARELLI S.p.A., Corbetta (IT)

( * ) Notice: Subject to any disclaimer, the term of this patent is extended or adjusted under 35 U.S.C. 154(b) by 239 days.

(21) Appl. No.: 15/053,691

(22) Filed: Feb. 25, 2016

(65) Prior Publication Data

US 2016/0251987 A1 Sep. 1, 2016

(30) Foreign Application Priority Data

Feb. 27, 2015 (IT) .............. BO2015A0103

(51) Int. Cl.
*F02M 35/10* (2006.01)
*F01M 13/00* (2006.01)
(Continued)

(52) U.S. Cl.
CPC ......... *F01M 13/0011* (2013.01); *F01M 11/10* (2013.01); *F01M 13/04* (2013.01);
(Continued)

(58) Field of Classification Search
CPC ............ F01M 11/10; F01M 13/0011; F01M 13/0416; F01M 13/04; F01M 2013/0438;
(Continued)

(56) References Cited

U.S. PATENT DOCUMENTS 4,063,538 A * 12/1977 Powell ............... F02P 5/1455
123/406.42
9,416,694 B2 * 8/2016 Jentz ..................... F01M 1/18
(Continued)

FOREIGN PATENT DOCUMENTS

| EP | 2811127 A1 | 12/2014 |
| JP | 2005264917 A | 9/2005 |
| WO | 2013000308 A1 | 1/2013 |

OTHER PUBLICATIONS

Search Report and Written Opinion issued by the Italian Patent Office for Italian Patent Application No. B020150103 dated Oct. 13, 2015.

*Primary Examiner* — Marguerite McMahon (74) *Attorney, Agent, or Firm* — Howard & Howard Attorneys PLLC (57) ABSTRACT

Method to control the sealing of a blow-by gas breather circuit of an internal combustion engine, comprising a separator device to agglomerate the particles of finely atomised lubricating oil and to remove the solid particulate particles and having an outlet connected by a pipe to an intake pipe through which the gas purified from the lubricating oil and the particulate flows out and a pressure sensor; the method providing the following steps: acquiring the signal coming from said pressure sensor; filtering the signal coming from the pressure sensor; integrating over time the square of the filtrated signal coming from the pressure sensor; and determining the sealing of the pipe according to the integrated signal which is the combustion energy generated by the internal combustion engine.

10 Claims, 4 Drawing Sheets (51) Int. Cl.
*F01M 13/04* (2006.01)
*F02D 41/22* (2006.01)
*G01M 3/00* (2006.01)
*G01M 15/09* (2006.01)
*F01M 11/10* (2006.01)

(52) U.S. Cl.
CPC ......... *F01M 13/0416* (2013.01); *F02D 41/22* (2013.01); *G01M 3/00* (2013.01); *G01M 15/09* (2013.01); *F01M 2013/0072* (2013.01); *F01M 2013/0438* (2013.01); *F02D 2200/0406* (2013.01); *F02D 2250/08* (2013.01); *Y02T 10/40* (2013.01)

(58) Field of Classification Search
CPC ............ F01M 2013/0072; F02D 41/22; F02D 2250/08; G01M 15/09; G01M 3/00; Y02T 10/40
USPC .................................. 701/101; 123/572–574
See application file for complete search history.

(56) References Cited

U.S. PATENT DOCUMENTS

| | | | |
|---|---|---|---|
| 2003/0105575 A1* | 6/2003 | Haskara | F02D 41/0062 701/101 |
| 2011/0246044 A1* | 10/2011 | Buslepp | F02D 35/023 701/101 |
| 2014/0081548 A1 | 3/2014 | Pursifull et al. | |
| 2014/0236452 A1* | 8/2014 | Fischer | F02D 41/1401 701/101 |

\* cited by examiner

METHOD TO CONTROL THE SEALING OF A BLOW-BY GAS BREATHER CIRCUIT OF AN INTERNAL COMBUSTION ENGINE

TECHNICAL FIELD

The present invention relates to a method to control the sealing of a blow-by gas breather circuit of an internal combustion engine.

STATE OF THE ART

As already known, an internal combustion engine supercharged by a turbocharger supercharging system comprises a head defining a plurality of cylinders, each of which is connected to an intake manifold through at least a respective intake valve, and to an exhaust manifold through at least a respective exhaust valve, the fuel being injected into the manifold by an injector. The head also defines a crankcase and a pan to collect the lubricating oil; the oil pan, preferably made of cast iron, closes said crankcase on the lower side, and forms the lubricating oil tank.

The intake manifold receives a gas mixture that includes both exhaust gas and fresh air, namely air coming from the outside through an intake pipe, which is provided with an air filter for the fresh airflow and is regulated by a butterfly valve.

The internal combustion engine further comprises a crankcase breather circuit for releasing outside the crankcase the so-called "blow-by" gas, namely the gas passing between the cylinders and the relative pistons. Typically, the crankcase breather circuit has a double ventilation and comprises a separating device and a PCV (positive cranking ventilation) valve. The "blow-by" gas contains in suspension finely atomised oil particles as well as solid particles (particulate), mainly having a carbonaceous nature, which are formed partly by partially unburnt products of combustion and partly by solid impurities normally contained in the oil.

A branch of the breather circuit connects the inside of the crankcase with the intake pipe, and includes the separator device having an inlet connected through a pipe to the crankcase and an outlet connected through a further pipe to the intake pipe. The separator device further comprises a filtering element to agglomerate the finely atomised oil particles and to remove the solid particulate particles. The separator device has a draining outlet arranged downstream of the filtering element and connected through a draining pipe to a lower portion of the crankcase. In use, the blow-by gas, with the oil and the suspended particulate, flows into the separator device; the oil particles agglomerate and the oil is recirculated in the lower portion of the crankcase through the draining outlet and the draining pipe, then flowing into the oil pan. The particulate is substantially incorporated in the oil drops that agglomerate and are recirculated in the crankcase as well. The gas purified from oil and particulate flows through the outlet of the separator device and the further pipe 19 and is recirculated in the intake pipe 6.

The international regulations relating to on-board diagnostics of vehicles require controlling the sealing of a blow-by gas breather circuit of an internal combustion engine.

The respect of the constraints imposed by these international regulations is particularly critical, especially with regard to the further pipe connecting the separator device to the intake pipe. In other words, the international rules relating to the on-board diagnostics of vehicles require detecting when one of the ends of this pipe disconnects from the separator device or from the intake pipe to prevent the blow-by gas from dispersing in the atmosphere.

DESCRIPTION OF THE INVENTION

The object of the present invention is therefore to provide a method to control the sealing of a blow-by gas breather circuit of an internal combustion engine, which is free from the drawbacks of the prior art and which is, at the same time, easily and economical implemented.

In accordance with the present invention, it is provided a method to control the sealing of a blow-by gas breather circuit of an internal combustion engine, as claimed by the appended claims.

BRIEF DESCRIPTION OF THE DRAWINGS

The present invention will now be described with reference to the accompanying drawings showing a non-limiting embodiment, wherein.

PREFERRED EMBODIMENTS OF THE INVENTION

Figure 1:
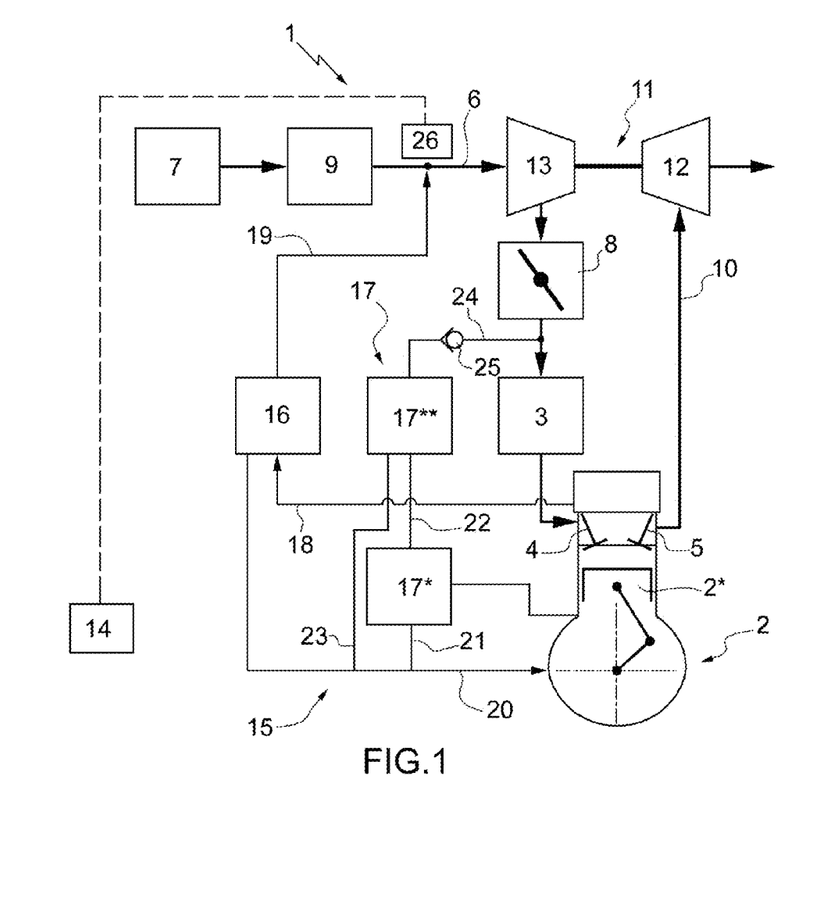
FIG. 1 is a schematic view of an internal combustion engine provided with a blow-by gas breather circuit.

In FIG. 1, the number 1 indicates as a whole an internal combustion engine supercharged by a turbocharger supercharging system.

The internal combustion engine 1 includes a cylinder head defining a plurality of cylinders 2 (only one of which shown in FIG. 1), each of them being connected to an intake manifold 3 through at least a respective intake valve 4 and to an exhaust manifold (not shown) through at least a respective exhaust valve 5, and inside which the fuel is injected by an injector. The head also defines a crankcase (not shown) and a pan (not shown) to collect the lubricating oil. The oil pan, preferably made of cast iron, closes the crankcase on the lower side and forms the lubricating oil tank.

Each cylinder 2 houses a respective piston 2\*, mechanically connected through a connecting rod to a crankshaft to transmit to the crankshaft 4 the force generated by the combustion inside the cylinder 2.

The intake manifold 3 receives a gas mixture including both the exhaust gas and fresh air, namely air from the outside, through an intake pipe 6, which is provided with an air filter 7 for the fresh airflow and is regulated by a butterfly valve 8. An airflow meter 9 is also arranged along the intake pipe 6, downstream of the air filter 7, to detect the mass of the fresh airflow sucked in by the internal combustion engine 1.

According to a preferred variant, an intercooler (not shown) for cooling the sucked air, and preferably integrated in the intake manifold, is arranged along the intake pipe 5. The exhaust manifold 5 is connected to an exhaust pipe 10 feeding the exhaust gas produced by the combustion to an exhaust system (not shown) which releases the gas produced by combustion into the atmosphere.

The supercharging system of the internal combustion engine 1 comprises a turbocharger 11 provided with a turbine 12, which is arranged along the exhaust pipe 10 to rotate at high speed under the action of the exhaust gas expelled from the cylinders 2, and a compressor 13, which is arranged along the intake pipe 5 and is mechanically connected to the turbine 12 to be driven in rotation by the turbine 12 to increase the air pressure in the intake pipe 5.

The internal combustion engine 1 is controlled by an electronic control unit 14 supervising the operation of all the components of the internal combustion engine 1.

The internal combustion engine 1 also comprises a crankcase breather circuit 15 for releasing outside the crankcase the so-called "blow-by" gas, or gas passing between the cylinders 2 and the related piston 2*. The crankcase breather circuit 15 preferably has a double ventilation, as better described hereinafter. The crankcase breather circuit 15 includes a separator device 16 and a PCV (positive cranking ventilation) device 17.

The "blow-by" gas contains in suspension finely atomised oil particles as well as solid particles (particulate), mainly having a carbonaceous nature, which are formed partly by partially unburnt products of combustion and partly by solid impurities normally contained in the oil.

A first branch of the breather circuit 15, preferably of the closed type, connects the inside of the crankcase with the intake pipe 6, downstream of the flow meter 9 and upstream of the compressor 13, and includes the separator device 16 having an inlet connected by a pipe 18 to the crankcase and an outlet connected by a pipe 19 to the intake pipe 6, downstream of the flow meter 9 and immediately upstream of the compressor 13. The separator device 16 preferably comprises a filtering element to agglomerate the particles of finely atomised oil and to remove the solid particulate particles. The separator device 16 has a draining outlet, arranged downstream of the filtering element and connected by a pipe 20 to a lower portion of the crankcase. The blow-by gas, with the oil and the suspended particulate, flows through the pipe 18 in the separator device 16. The oil particles agglomerate and the oil is recirculated in the lower portion of the crankcase through the draining outlet and the pipe 20, then flowing into the oil pan. The particulate is substantially incorporated in the oil drops that agglomerate and are also recirculated in the crankcase. The gas purified from oil and particulate flows through the outlet of the separator device 16 and the pipe 19 and is recirculated in the intake pipe 6.

A second branch of the breather circuit 15 includes the PCV device 17 which consists of a two-stage separator body for the crankcase ventilation for the blow-by gas coming directly from the crankcase and including the gas leaked from the combustion chambers of the cylinders 2, namely not retained by the elastic bands, and the oil that naturally evaporates due to the heat. In particular, the PCV device 17 includes a primary oil separator 17* arranged close to the cylinders 2. In the primary oil separator 17*, the blow-by gas flows through a maze to separate the oil coarse particles. The primary oil separator 17* has two separation stages; the oil particles agglomerate and the oil is recirculated in the lower portion of the crankcase through a draining outlet of the primary oil separator 17* and a pipe 21, then flowing into the oil pan. The blow-by gas continues to flow from the primary oil separator 17* through a channel 22 into a secondary oil separator 17 which is preferably integrated in the head of the internal combustion engine 1. In the secondary oil separator 17, the blow-by gas from the primary oil separator 17* flows through a maze to separate the ultrafine oil particles. The oil particles agglomerate and the oil is recirculated in the lower portion of the crankcase through a draining outlet of the secondary oil separator 17** and a pipe 23, then flowing into the oil pan.

The blow-by gas flows in a pipe 24, preferably integrated in the head of the internal combustion engine 1 up to a regulating valve 25. The pressure-regulating valve 25 regulates the blow-by gas flow depending on the pressure conditions in the intake manifold 3.

Finally, the breather circuit 15 comprises a pressure sensor 26 arranged in the intake pipe 6. In particular, the pressure sensor 26 is arranged at the junction of the pipe 19 with the intake pipe 6. In other words, the pressure sensor 26 is arranged in a position close to and facing the point where the pipe 19 leads into the intake pipe 6.

Hereinafter it is described the control mode of the sealing of the breather circuit 15 of the internal combustion engine 1 that is implemented by the control unit 14.

The control mode of the sealing of the breather circuit 15, which is implemented by the control unit 14, detects a disconnection of the pipe 19 of the breather circuit 15. In particular, the control mode of the sealing of the breather circuit 15 that is implemented by the control unit 14 detects both a disconnection of the pipe 19 of the breather circuit 15 on the side of the intake pipe 6 and a disconnection of the pipe 19 of the breather circuit 15 on the side of the separator device 16.

The control mode of the sealing of the breather circuit 15 that is implemented by the control unit 14 detects a disconnection of the pipe 19 of the breather circuit 15 through an appropriate processing of a signal coming from the pressure sensor 26. The pressure sensor 26 comprises a pressure meter, which detects the maximum intensity amplitude of the pressure waves generated in the cylinders 2 of the internal combustion engine 1.

Figure 3:
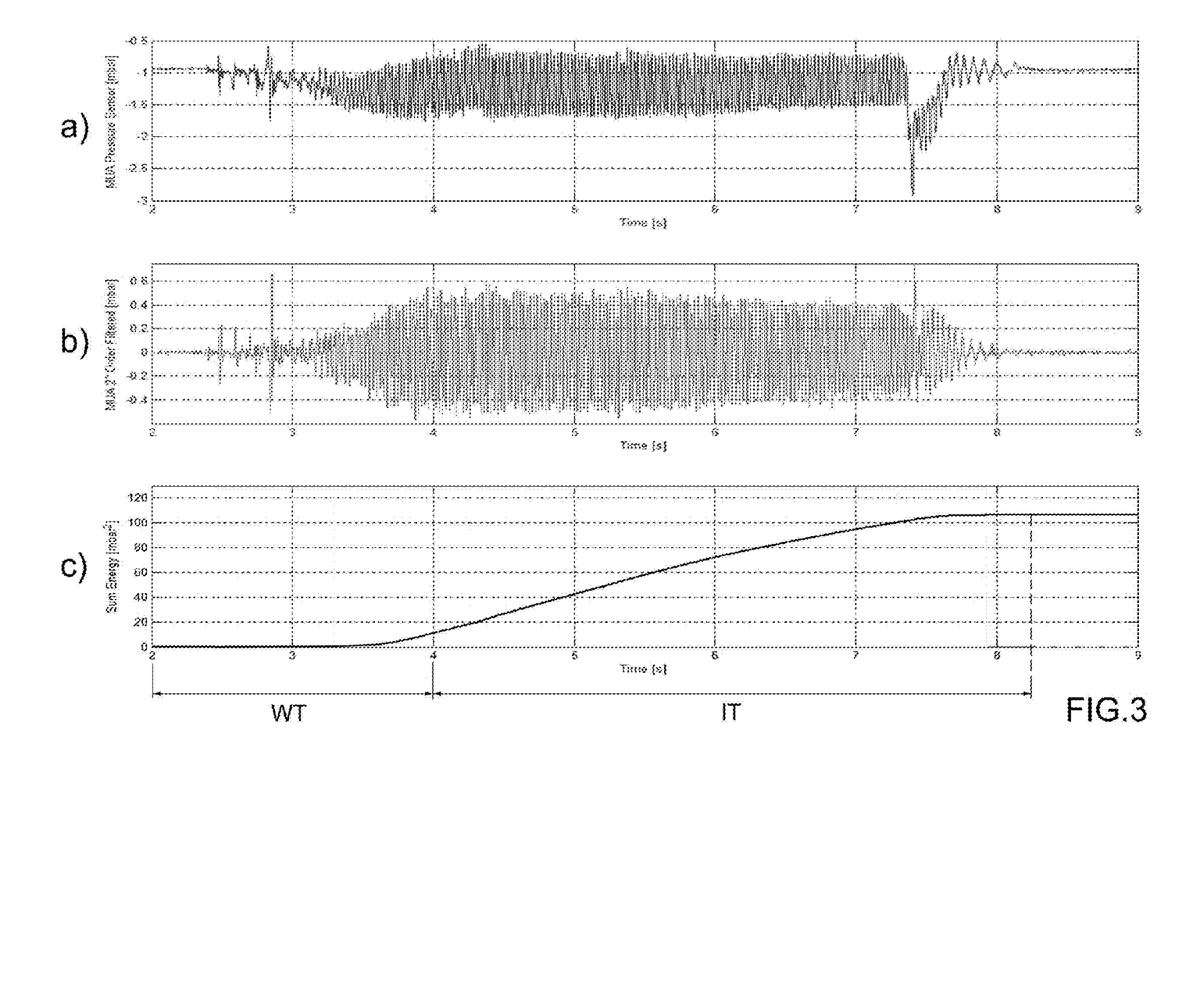
FIG. 3 shows the signal detected by a pressure sensor of the blow-by gas breather circuit in the case where there is no disconnection in the blow-by gas breather circuit of FIG. 1.

FIG. 3 shows the signal from the pressure sensor 26 connected to the control unit 14 in the case where there is no disconnection of the pipe 19 of the breather circuit 15, namely in the case where both ends of the pipe 19 of the breather circuit 15 are connected to the inlet duct 6 and to the separator device 16.

Figure 4:
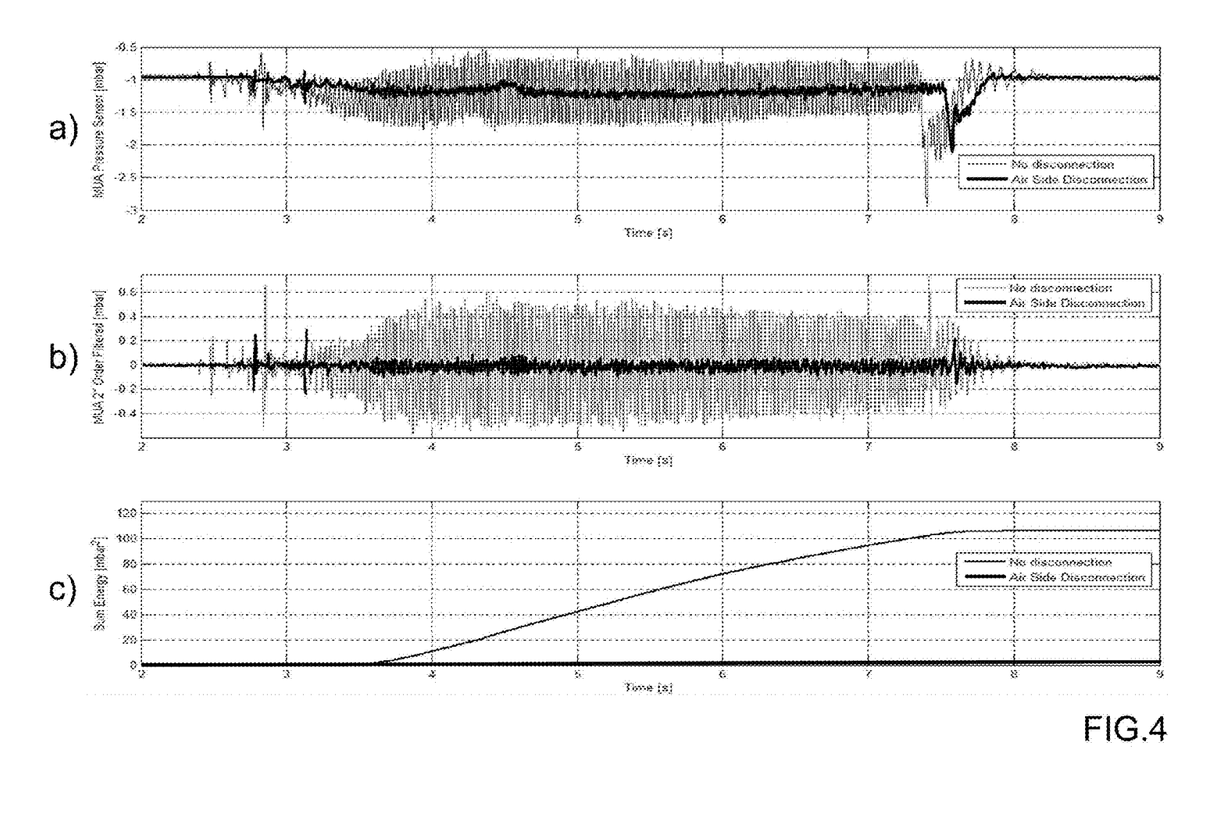
FIGS. 4 and 5 respectively show the signal detected by the pressure sensor of the blow-by gas breather circuit in the case where there is a disconnection in comparison with the case where there is no disconnection in the blow-by gas breather circuit of FIG. 1.
Figure 5:
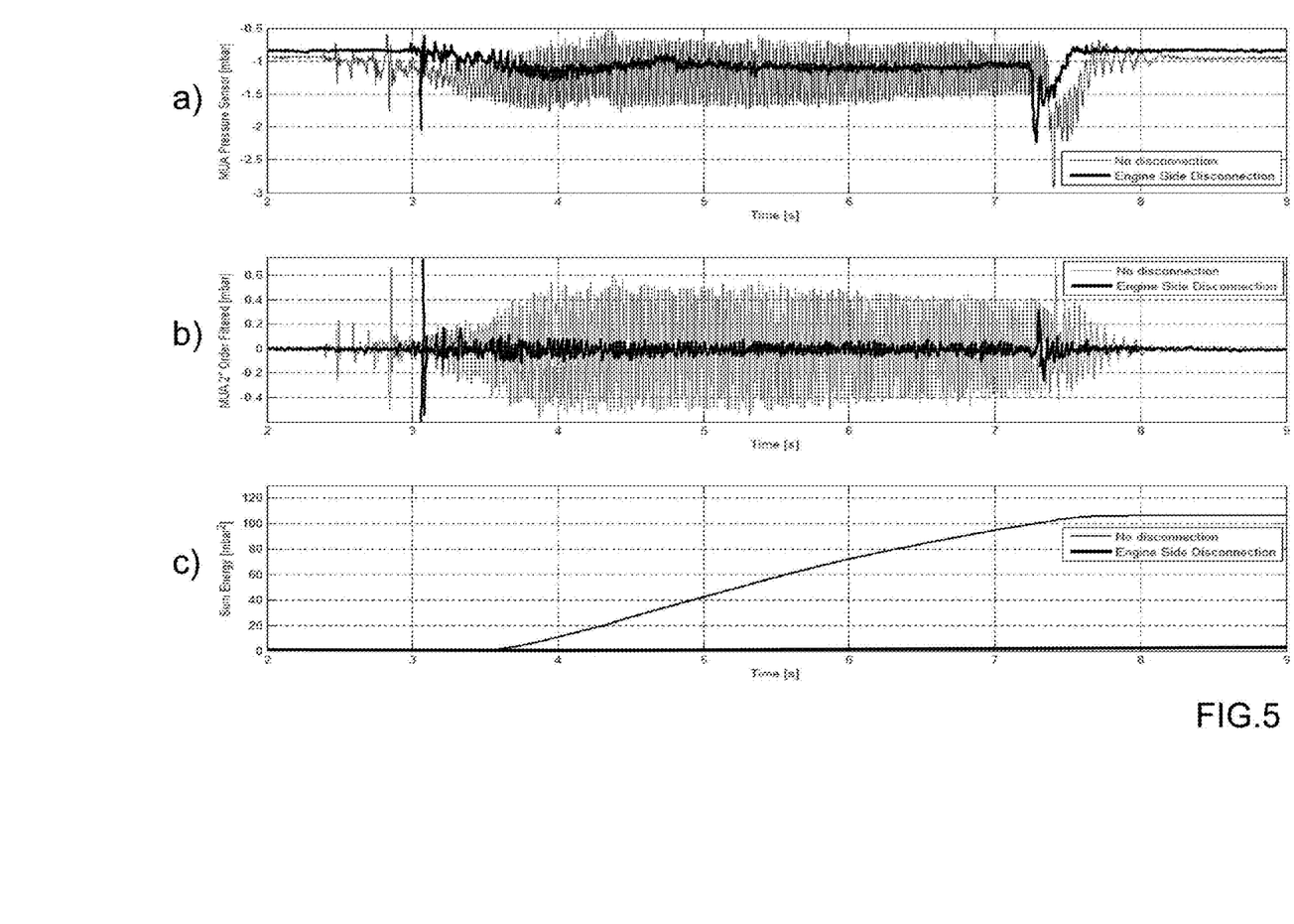

FIG. 4 shows the comparison between the signal coming from the pressure sensor 26 connected to the control unit 14 in the case where there is no disconnection of the pipe 19 of the breather circuit 15, namely in the case where both ends of the pipe 19 of the breather circuit 15 are connected to the inlet duct 6 and to the separator device 16 ("No disconnection") and the signal coming from the pressure sensor 26 connected to the control unit 14 in the case where the pipe 19 of the breather circuit 15 is disconnected from the suction pipe 6 ("Air side disconnection"). FIG. 5 shows the comparison between the signal coming from the pressure sensor 26 connected to the control unit 14 in the case where there is no disconnection of the pipe 19 of the breather circuit 15, namely in the case where both ends of the pipe 19 of the breather circuit 15 are connected to the inlet duct 6 and to the separator device 16 ("No disconnection") and the signal coming from the pressure sensor 26 connected to the control unit 14 in the case where the pipe 19 of the breather circuit 15 is disconnected from the separator device 16 ("Engine side disconnection").

Figure 2:
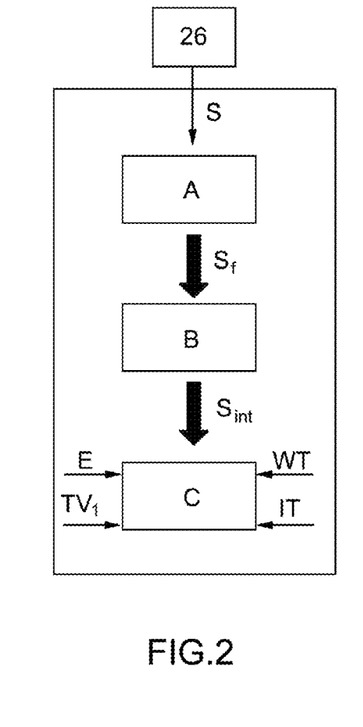
FIG. 2 is a block diagram of the method to control the sealing of a blow-by gas breather circuit according to the present invention.

FIG. 2 schematically shows the control mode of the sealing of the breather circuit 15 which is implemented by the control unit 14, where the block A receives as input the raw signal S coming from said pressure sensor 26 connected to the control unit 14; the block A processes the raw signal S coming from said pressure sensor 26 connected to the control unit 14 and then provides the processed signal S' to the next block B. The raw signal S coming from the pressure sensor 26 connected to the control unit 14 is respectively shown in FIGS. 3a, 4a and 5a.

In particular, the raw signal S coming from said pressure sensor connected to the control unit 14 is filtered by a filter. According to a preferred variant, this filter is a second order filter. It is clear that a correct determination of the characteristic parameters of the second order filter in the block A represents a fundamental aspect of the control mode of the sealing of the breather circuit 15, which is implemented by the control unit 14. In fact, the filter should remain "deaf" to the middle component of the raw signal S coming from said pressure sensor 26, but should take into account the high frequencies that are representative of the strokes of the pistons 2* in their respective cylinders 2.

Once the raw signal S coming from said pressure sensor 26 connected to the control unit 14 has been filtered, a filtered and processed signal $S_f$ can be transmitted to the block B. The filtered and processed signal $S_f$ to be transmitted to the block B is shown respectively in FIGS. 3b, 4b and 5b.

According to a preferred variant, starting from the filtered signal $S_f$, the integral over time of the square of the filtered signal $S_f$ is calculated and the integrated signal $S_{int}$ is then transmitted to the block C. The integral action on the square of the filtered signal $S_f$ allows the mode control of the sealing of the breather circuit 15, which is implemented by the control unit 14, to store the past values of the filtered signal $S_f$. As shown in FIG. 3, the integrated signal $S_{int}$ is then transmitted to the block C.

Please note that the integrated signal $S_{int}$, which is transmitted to the block C, is actually the combustion energy generated by the internal combustion engine 1. It has been experimentally proved that the combustion energy is variable between a void value, indicating the disconnection of the pipe 19 of the breather circuit 15, and a maximum value, indicating the perfect connection of both ends of the pipe 19 of the breather circuit to the intake pipe 6 and to the separator device 16. The integrated signal $S_{int}$ transmitted to the block C is shown respectively in FIGS. 3c, 4c and 5c.

According to a preferred variant, inside the block C, the integrated signal $S_{int}$ which is transmitted to the block C and which is the combustion energy generated by the internal combustion engine 1, is compared with a threshold value TV representing the expected energy. In the case where the integrated signal $S_{int}$ which is transmitted to the C block and which is the combustion energy generated by the internal combustion engine 1 is higher than or equal to the threshold value TV, the control unit 14 is configured to detect that there has been no disconnection of the pipe 19 of the breather circuit 15, namely that both ends of the pipe 19 of the breather circuit 15 are connected to the inlet duct 6 and to the separator device 16.

In the case where the integrated signal $S_{int}$, which is transmitted to the block C and which is the combustion energy generated by the internal combustion engine 1, is lower than the threshold value TV, the control unit 14 is configured to detect that there has been a disconnection of the pipe 19 of the breather circuit 15, namely that the pipe 19 of the breather circuit 15 is disconnected from the intake pipe 6 or from the separator device 16.

Alternatively, inside the block C, the integrated signal $S_{int}$, which is transmitted to the block C and which is the combustion energy generated by the internal combustion engine 1, is compared with an expected energy value. The expected energy value E is in fact the combustion energy generated by the internal combustion engine 1 expected in the case where no disconnection of the pipe 19 of the breather circuit 15 occurs. In other words, in the case where both ends of the pipe 19 of the breather circuit 15 are connected to the inlet duct 6 and to the separator device 16, the combustion energy generated by the internal combustion engine 1 and detected by the pressure sensor 26 is substantially equal to the expected energy value E. In the case where the difference in absolute value between the integrated signal $S_{int}$, which is transmitted to the block C and which is the combustion energy generated by the internal combustion engine 1, and the expected energy value E is lower than or equal to a threshold value TV, the control unit 14 is configured to detect that there has been no disconnection of the pipe 19 of the breather circuit 15, namely that both ends of the pipe 19 of the breather circuit 15 are connected to the intake pipe 6 and to the separator device 16.

In the case where the same difference in absolute value between the integrated signal $S_{int}$, which is transmitted to the block C and which is the combustion energy generated by the internal combustion engine 1, and the expected energy value E is greater than the threshold value TV, the control unit 14 is configured to detect that there has been a disconnection of the pipe 19 of the breather circuit 15, namely that one of the ends of the pipe of the breather circuit 15 is disconnected from the intake pipe 6 or from the separator device 16.

The threshold value TV is determined in a preliminary setting and tuning step. Similarly, the profile of the expected energy values E representing the combustion energy generated by the internal combustion engine 1 expected in the case where there is no disconnection of the pipe 19 of the breather circuit 15 is determined in a preliminary setting and tuning step.

The control unit 14 is configured to implement the control mode of the sealing of the breather circuit 15 described in the preceding description with each manual start-up of the internal combustion engine 1 (e.g., in the case of an internal combustion engine 1 provided with the Stop & Start function, the detection occurs only at the first manual start-up and not at each ignition following a stop phase controlled by the Stop & Start function).

According to a preferred variant, a waiting time WT is determined in a preliminary setting and tuning step; typically, the waiting time WT is equal to some seconds (including approximately between 1 and 3 seconds). Once detected the start of the start-up phase of the internal combustion engine 1, the control unit 14 is configured to ignore the raw signal S coming from said pressure sensor 26 connected to the control unit 14, which is provided in the initial instants of the start-up phase. In other words, once detected the start of the start-up phase of the internal combustion engine 1, the control unit 14 is configured to ignore the raw signal S coming from said pressure sensor 26 for a time interval equal to the waiting time WT.

According to a preferred variant, also an integration time IT is determined in a preliminary setting and tuning step; typically the integration time IT is equal to some seconds (approximately 3 to 6 seconds). Preferably, the integration time IT is greater than the waiting time WT.

According to a preferred variant, both the threshold value TV and the expected energy value E representing the combustion energy generated by the internal combustion engine 1 expected in the case where there is no disconnection of the pipe 19 of the breather circuit 15 are directly proportional to the expected integration time IT.

Once detected the start of the start-up phase of the internal combustion engine 1, the control unit 14 is configured to process the raw signal S coming from the pressure sensor 26 connected to the control unit 14 according to the preceding description for a time interval equal to the integration time IT.

In other words, once detected the start of the start-up phase of the internal combustion engine 1, the control unit 14 is configured to compare the integrated signal, which is transmitted to the block C and which is the combustion energy generated by internal combustion engine 1, with the expected energy value E at the end of a time interval equal to the integration time IT.

According to a variant, in the case where it is expected a waiting time WT, once detected the start of the start-up phase of the internal combustion engine 1 and once spent a time interval equal to the waiting time WT, the control unit 14 is configured to process the raw signal S coming from the pressure sensor 26 connected to the control unit 14 according to the preceding description for a time interval equal to the integration time IT. That is, once detected the start of the start-up phase of the internal combustion engine 1 and once spent a time interval equal to the waiting time WT, the control unit 14 is configured to compare the integrated signal, which is transmitted to the block C and which is the combustion energy generated by the internal combustion engine 1, with the expected energy value E at the end of a time interval equal to the integration time IT.

According to a variant, the pressure sensor 26 is integral with the frame and is connected to a reading point of the pressure signal by means of a reduced diameter pipe leading into the junction of the pipe 19 with the intake pipe 6. In other words, the pressure sensor 26 is arranged to allow in any case a detection of the pressure signal where the pipe 19 leads into the intake pipe 6. This variant reduces the risk of detachment of the pressure sensor 26 from the intake pipe 6 in response to vibrations.

According to a preferred embodiment, the method to control the sealing of the breather circuit 15 also detects the presence of any holes in the intake manifold 3. According to this embodiment, it is possible to detect a disconnection in the second branch of the breather circuit 15 that connects the PCV device 17 to the intake manifold 3 and, in particular, it is possible to detect a disconnection of the pipe 24.

The above described method to control the sealing of the breather conduit 15 has numerous advantages.

In particular, the aforesaid detection mode is simply and economically implemented in a control unit 14 of an internal combustion engine 1, as it requires a reduced physical modification (namely, the insertion of the pressure sensor 26) and engages a modest computing capacity of the control unit 14.

Furthermore, the above described detection method allows an effective and timely detection when the pipe 19 of the breather circuit 15 is disconnected both from the end connected to the intake pipe 6 and from the end connected to the separator device 16.

The invention claimed is:

1. A method to control the sealing of a blow-by breather circuit (15) containing suspended lubricating oil and particulate in an internal combustion engine (1); the internal combustion engine (1) comprises a head defining a number of cylinders (2), which are connected to an intake manifold (3) that receives fresh air, namely air coming from the outside, through an intake pipe (6), and further defining a crankcase and a pan which is designed to collect the lubricating oil, closing said crankcase on the lower side; the internal combustion engine (1) further comprises a blow-by gas breather circuit (15) provided, in turn, with a separator device (16) to agglomerate finely atomized lubricating oil particles and to remove solid particulate particles, having an inlet which is connected through a first pipe (18) to the crankcase, from which it receives blow-by gas containing suspended lubricating oil and particulate, an outlet, which is connected through a second pipe (19) to the intake pipe (6) and through which the gas purified from the lubricating oil and the particulate flows out, and a draining outlet, which is connected through a third pipe (20) to a lower portion of the crankcase to which it feeds the agglomerated lubricating oil and particulate; the blow-by breather circuit (15) further comprising a pressure sensor (26); the method comprising the following steps:

acquiring the signal (S) coming from said pressure sensor (26);

processing the signal (S) coming from said pressure sensor (26), comprising the following sub-steps:
   filtering the signal (S) coming from said pressure sensor (26); and
   integrating over time the square of the filtered signal ($S_f$) coming from the pressure sensor (26), wherein the integrated signal ($S_{int}$) represents the combustion energy generated by the internal combustion engine (1); and determining the sealing of the second pipe (19) of the breather circuit (15) as a function of the integrated signal ($S_{int}$) representing the combustion energy generated by the internal combustion engine (1).

2. A method according to claim 1, further comprising the following steps:

determining an expected value (E) of the combustion energy generated by the internal combustion engine (1);

comparing the expected value (E) of the combustion energy generated by the internal combustion engine (1) with the integrated signal ($S_{int}$) representing the combustion energy generated by the internal combustion engine (1); and determining the sealing of the second pipe (19) of the breather circuit (15) as a function of the comparison between the integrated signal ($S_{int}$) representing the combustion energy generated by the internal combustion engine (1) and the expected value (E) of the combustion energy generated by the internal combustion engine (1).

3. A method according to claim 2, further comprising the following steps:

determining a threshold value (TV);

calculating the difference between the expected value (E) of the combustion energy generated by the internal combustion engine (1) and the integrated signal ($S_{int}$) representing the combustion energy generated by the internal combustion engine (1); and determining the sealing of the second pipe (19) of the breather circuit (15) as a function of the comparison between the threshold value (TV) and the difference between the expected value (E) of the combustion energy generated by the internal combustion engine (1)

and the integrated signal ($S_{int}$) representing the combustion energy generated by the internal combustion engine (1).

4. A method according to claim 3, comprising the further step of determining a disconnection of the second pipe (19) of the breather circuit (15), in case the difference between the expected value (E) of the combustion energy generated by the internal combustion engine (1) and the integrated signal ($S_{int}$) representing the combustion energy generated by the internal combustion engine (1) exceeds the threshold value (TV).

5. A method according to claim 3, comprising the further step of determining the perfect sealing of the second pipe (19) of the breather circuit (15), in case the difference between the expected value (E) of the combustion energy generated by the internal combustion engine (1) and the integrated signal ($S_{int}$) representing the combustion energy generated by the internal combustion engine (1) is lower than or equal to the threshold value (TV).

6. A method according to claim 1, wherein the pressure sensor (26) detects the pressure in a position close to and facing the point where the second pipe (19) of the breather circuit (15) leads into the intake pipe (6).

7. A method according to claim 1, wherein the sub-step of filtering the signal (S) coming from the pressure sensor (26) is performed by means of a second-order filter.

8. A method according to claim 1, comprising a further step of determining the sealing of the second pipe (19) of the breather circuit (15) at each starting of the internal combustion engine (1).

9. A method according to claim 8, further comprising the following steps:
determining a waiting time (WT); and
after having detected that the internal combustion engine (1) has been started, ignoring the signal (S) coming from the pressure sensor (26) for a time interval lasting as long as the waiting time (WT).

10. A method according to claim 9, further comprising the followings steps:
determining an integration time (IT); and
after having detected that the internal combustion engine (1) has been started, integrating over time the square of the filtered signal ($S_f$) coming from the pressure sensor (26) for a time interval lasting as long as the integration time (IT).

* * * * *